May 25, 1926. 1,586,445
D. F. HINKLEY
BATTERY TESTER
Filed Jan. 31, 1924 2 Sheets-Sheet 2
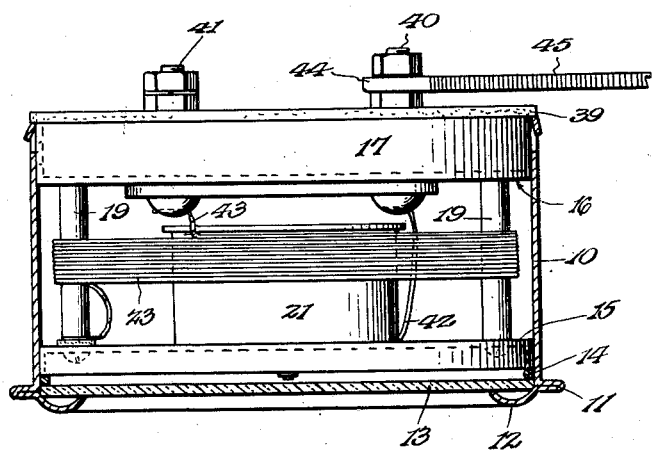
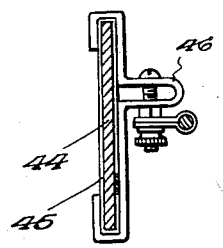
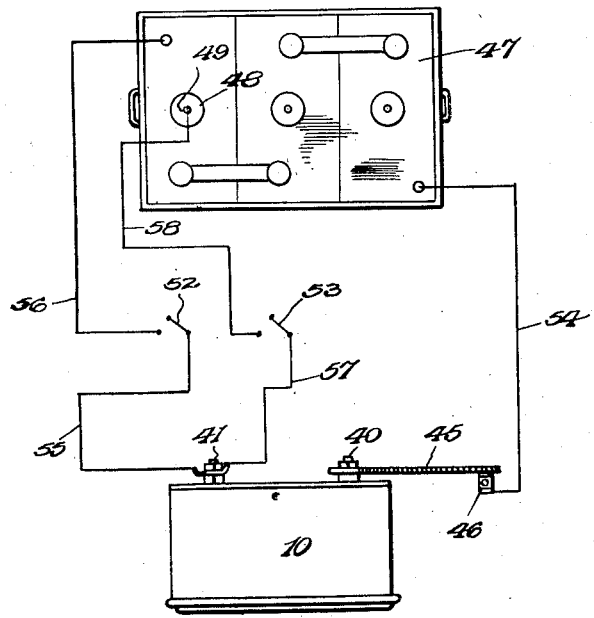
Inventor
D. F. Hinkley.
By
Lacy & Lacy, Attorneys Patented May 25, 1926.

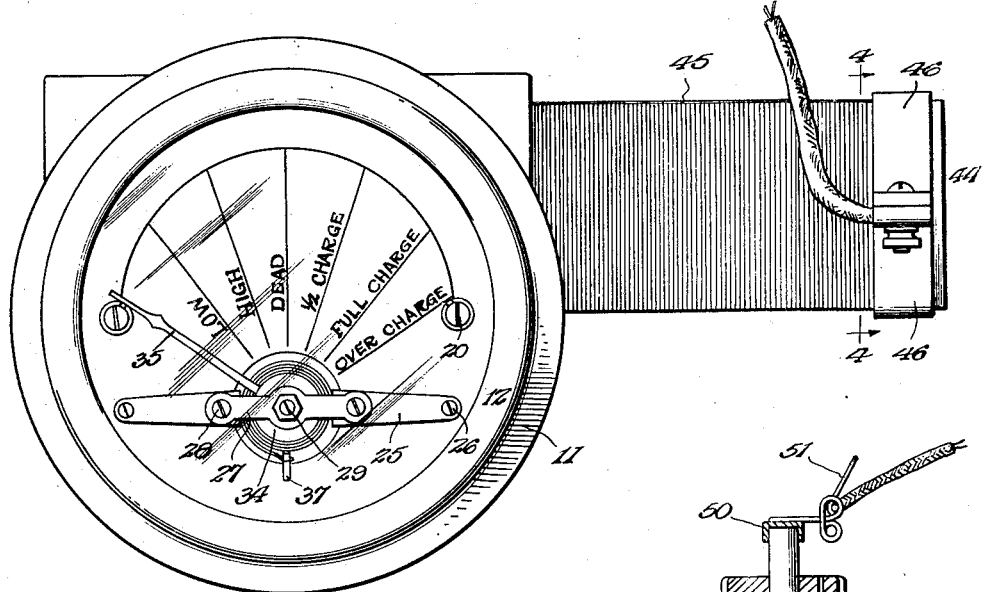

1,586,445

UNITED STATES PATENT OFFICE.

DONALD F. HINKLEY, OF GOTHENBURG, NEBRASKA.

BATTERY TESTER.

Application filed January 31, 1924. Serial No. 689,729.

This invention relates to an improved battery tester and seeks, among other objects, to provide a device of this character which may be mounted upon the instrument board of a motor vehicle and connected with the battery of the vehicle so that the device may be conveniently employed at any time for testing the charge condition of the battery as well as also testing the electrolyte level of the battery.

The invention seeks, as a further object, to provide a device which will be simple in construction, and, at the same time, dependable in operation.

And the invention seeks, as a still further object, to provide a device which may be readily installed on practically any conventional make of motor vehicle.

Other and incidental objects will appear hereinafter.

In the drawings:—

Figure 1 is a front elevation of my improved device,

Figure 2 is a vertical sectional view particularly showing the mounting of the indicator, Figure 3 is a horizontal sectional view on the line 3—3 of Figure 2, looking in the direction of the arrows, Figure 4 is a detail sectional view on the line 4—4 of Figure 1, looking in the direction of the arrows, Figure 5 is a diagrammatic view showing the manner in which the device is electrically connected with a battery, and Figure 6 is a detail sectional view showing a special plug provided for the battery.

In carrying the invention into effect, I employ a preferably cylindrical casing 10 provided near its forward end with a surrounding bead 11 continued to form an inwardly directed annular flange 12, and seating against said flange is a closure pane 13 secured by a split clamping ring 14. The casing is open at its rear end and removably fitting in the casing to abut the ring 14 is a face plate 15. Closing the casing at its rear end is a rear end plate 16 having an annular flange 17 snugly fitting in the casing, and removably securing the end plate in position are coacting knobs and sockets 18 carried by the casing and said flange respectively. Permanently secured to the plate 16 at spaced diametric points are forwardly directed posts 19 against which the face plate 15 rests, and extending through said face plate are screws 20 screwed into the posts for detachably connecting the face plate therewith. Thus, the plates 15 and 16 are united to form a unit which is bodily removable from the casing 10. Mounted upon the face plate 15 is an electro-magnet 21 having a tubular core 22 fixed at its outer end in a suitable opening in the face plate and, as best brought out in Figure 3, the winding of the magnet is continued at one end and looped around the posts 19, to provide a number of free windings 23. Freely received through the core is a substantially U-shaped yoke or cage 24 terminating at its ends in oppositely directed straps 25 secured to the face plate by screws 26 and extending between the inner ends of said straps is a bridge plate 27 secured to the straps and to the face plate by screws 28. Screwed through the bridge plate is a bearing stud 29 carrying a lock nut 30, and journaled at one end upon said screw and at its opposite end upon the inner end of the cage 24 is a spindle 31. Confined between the legs of the cage 24 is a pole plate 32 and fixed to the spindle to cooperate with said plate is an armature 33. Abutting the armature is a disc 34 from which extends an indicator 35, offset to overlie the face plate 15, and overlying said disc is a spring 35', one end of which is secured to the spindle. Clamped between the plate 27 and the straps 25 of the cage 24 is a cross plate 36 and mounted between said plates is an arm 37 provided at its inner end with an eye freely surrounding the stud 29 and near its outer end with a loop 38 in which the free end of the spring 35 is fixed. Thus, when the magnet 21 is energized, the indicator 35 will be swung in a clockwise direction while, when the magnet is de-energized, the spring 35 will, as shown in Figure 1, return the indicator to its normal position and, of course, the arm 37 may be adjustably swung about the stud 29 as a center for varying the tension of said spring. The arm is, of course, frictionally held in adjusted position by the plates 27 and 36 which function to exert a slight clamping action on the arm. As shown the face plate 15 carries a dial preferably having the designations Low, High, Dead, Half charge, Full charge, and Over charge thereon.

Positioned against the rear edge of the casing 10 is an insulating strip 39 and extending through said strip and through the end plate 16 are binding posts 40 and 41, to one of which is attached a lead wire 42 extending to one end of the winding of the electro-magnet, while to the other of said posts is attached a return wire 43, the posts being, as particularly shown in Figure 2, suitably insulated from the plate 16. Secured at one end upon the post 40 is an insulating strip 44 carrying a resistance 45 and adjustable along the strip to cooperate with said resistance is a contact clamp 46.

As suggested in Figure 2 of the drawings, the device is preferably mounted upon the instrument board of a vehicle and in conjunction with the device I provide a special plug for the vehicle battery, the battery being conventionally illustrated at 47. The plug mentioned is shown in detail in Figure 6, and includes an insulating shell 48 threaded at one end for engagement in the usual plug opening of one of the cells of the battery. The shell is, of course, of suitable insulating material and extending through the top wall of the shell is a preferably carbon terminal or auxiliary electrode 49 suitably fixed to the shell. At its upper end, the terminal is provided with a cap 50 to which is attached an appropriate connector 51, so that a circuit wire may be readily connected with the terminal, the terminal being of such length that when the shell is mounted upon the battery, the lower end of the terminal will be disposed at the proper level for the electrolyte of the battery. Further, in conjunction with the device, I employ, as diagrammatically shown in Figure 5, a pair of suitable switches 52 and 53 which may also be mounted upon the instrument board of the vehicle near the device. In electrically connecting the device with the battery, a wire 54 is led from the positive terminal of the battery to the clamp 46 of the resistance 45 and extending from the binding post 41 of the device to the switch 52 is a wire 55. Leading from said switch to the negative terminal of the battery is a wire 56. Leading from the post 41 of the device to the switch 53 is a wire 57 and extending from said switch to the terminal 49 of the special plug provided, is a wire 58.

As will now be seen, when the switch 52 is closed, current will flow from the battery through the wire 54 and resistance 45 to the electro-magnet and from the magnet through the wire 55 and thence through the wire 56 to return to the battery. Accordingly, the magnet will be energized so that the indicator 35 will be swung for indicating the charge condition of the battery. For determining whether or not the electrolyte of the battery is low, the switch 53 is closed. If the electrolyte stands at a level so as to touch the lower end of the terminal 49, current will flow through the wire 54 and electro-magnet 21 and through said magnet to the wires 57 and 58 to return to the battery. Thus, the indicator 35 will be swung. On the other hand, should the electrolyte of the battery be below the lower end of the terminal 49, no current will flow through the circuit when the switch 53 is closed, so that the indicator 35 will not be swung, which circumstance will, of course, indicate to the operator that the battery needs replenishing with water.

The free windings 23 are provided in connection with the magnet 21 in order that one or more or all of the turns of said windings may be conveniently included in the circuit of the magnet or excluded from said circuit, to suit batteries of different voltages.

Having thus described the invention, what I claim is:—

1. A battery tester including a casing, a face plate therein, a back plate closing the casing, means extending between and rigidly connecting said plates to form a unit bodily removable from the casing, an electro-magnet mounted upon the face plate and having a tubular core, said magnet being provided with a plurality of free turns looped around said means and exposed whereby access may be readily had to said turns for connecting one or more of the turns in the magnet circuit, a rotatable spindle accommodated by said core and having an armature to cooperate with the magnet, and an indicator carried by the spindle to be swung thereby in front of the face plate.

2. A battery tester including a casing, a face plate therein, a back plate closing the casing, spaced posts extending between and rigidly connecting said plates to form a unit bodily removable from the casing, an electro-magnet mounted upon the face plate and having a tubular core, said magnet being provided with a plurality of free turns looped around said posts and exposed whereby access may be readily had to said turns for connecting one or more of said turns in the magnet circuit, a rotatable spindle accommodated by said core and having an armature to cooperate with the magnet, and an indicator carried by the spindle to be swung thereby in front of the face plate.

In testimony whereof I affix my signature.

DONALD F. HINKLEY. [L. S.]